Patented Apr. 29, 1952

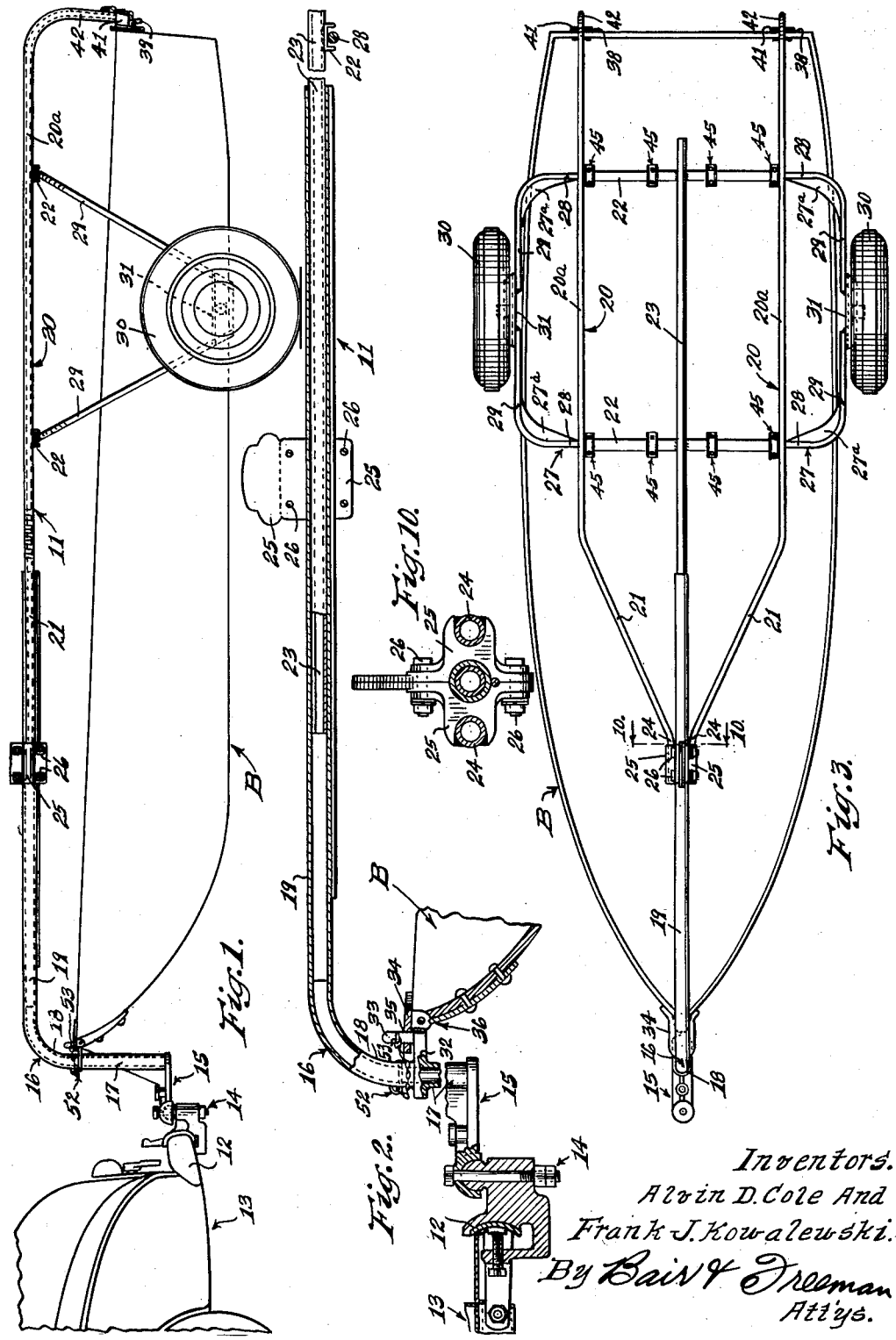

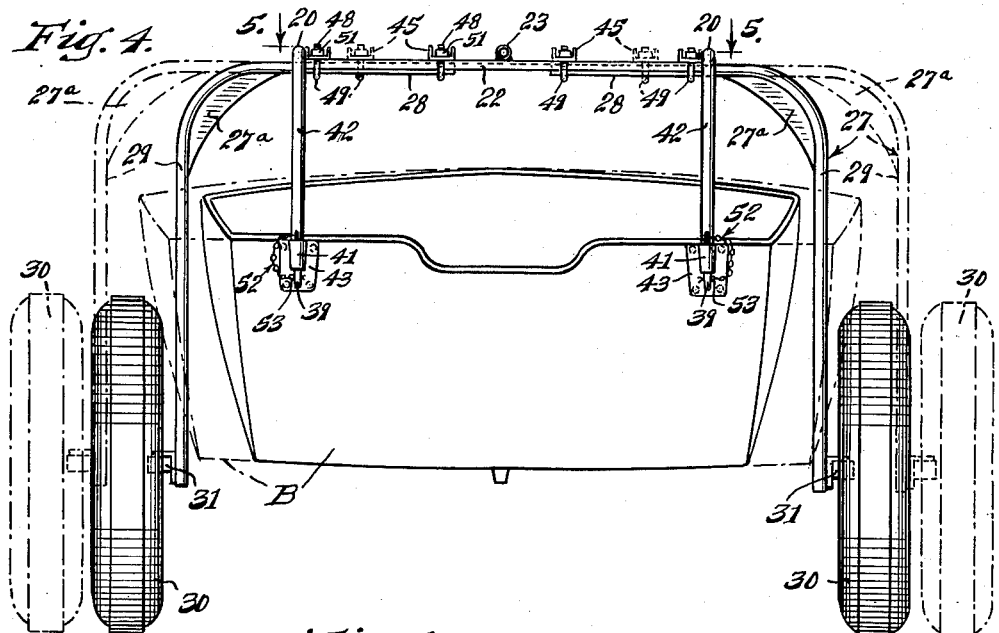
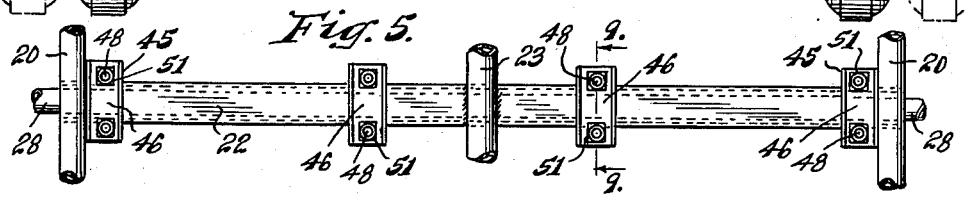
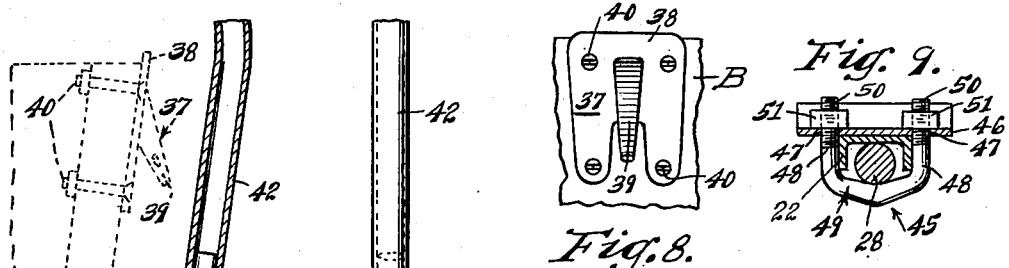
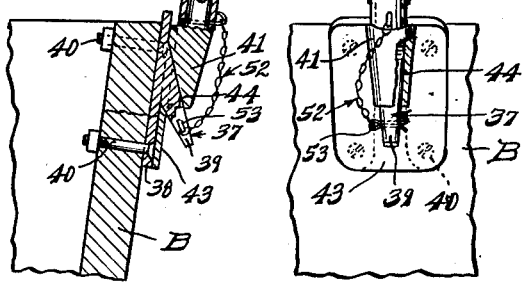

2,594,540

UNITED STATES PATENT OFFICE 2,594,540

ADJUSTABLE TRAILER FOR BOATS

Alvin D. Cole and Frank J. Kowalewski,
La Crosse, Wis.

Application December 10, 1949, Serial No. 132,321

4 Claims. (Cl. 280—34)

This invention relates to a trailer adapted to be drawn by a moving vehicle and more particularly to a trailer for carrying boats, which trailer is adjustable in its length and width so as to provide for differently sized boats.

One of the objects of this invention is to provide a light, sturdy, and flexible trailer for carrying a boat.

Another object of this invention is to provide a trailer for boats which is adjustable in both length and width so as to be adaptable for differently sized boats.

A further object of this invention is to provide a trailer for boats having a supporting means which also clamps the boat in position relative to the trailer so that there will be no motion of the boat relative to the trailer.

A still further object of this invention is to provide a trailer for boats which is inexpensively and easily manufactured.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which:

Figure 1 is a side view of the trailer shown attached to the rear bumper of an automobile and also showing a boat in suspended position;

Figure 2 is an enlarged side view, partially broken away, of a portion of the trailer shown in Figure 1;

Figure 3 is a top plan view of the trailer and boat shown in Figure 1.

Figure 4 is a rear end view of the trailer and showing in dot-dash lines the variation in trailer width adapting the trailer for use with wider boats;

Figure 5 is an enlarged plan view of a typical transverse structural member taken on the line 5—5 shown in Figure 4;

Figure 6 is an enlarged detail view of the connection of one of the longitudinal members of the trailer to the boat, also showing in dash lines the boat in disconnected position so as to clearly illustrate what portion of the connection is fastened to the boat;

Figure 7 is another view of the connection shown in Figure 6 with parts broken away, and is taken looking from the right of Figure 6;

Figure 8 is a view of the male connector attached to the boat shown in dash lines in Figure 6, and is a view taken looking towards the rear of the boat;

Figure 9 is a cross-section view of the clamp used in adjusting the width of the trailer and is taken on the line 9—9 of Figure 5;

Figure 10 is a cross-section view of the clamp used in adjusting the length of the trailer and is taken on the line 10—10 of Figure 3.

Referring to Figures 1 to 3 there is shown a boat trailer generally indicated by the numeral 11, connected to the rear bumper 12 of an automobile 13. The portion of the trailer hitching mechanism attached to the automobile is generally indicated by numeral 14 and the portion of the trailer hitching mechanism mounted on the trailer 11 is generally indicated by numeral 15.

Referring in particular to the trailer structure, there is shown a tubular member 16 which is secured, preferably by welding, to trailer hitching mechanism 15. Tubular member 16 consists of a vertical section 17, a curved section 18 and a substantially horizontal sleeve section 19.

The trailer structure is substantially a framework having a pair of longitudinal tubular members 20 spaced from each other and extending in substantially parallel relation forwardly from the rear of the trailer. The parallel runs of the longitudinal tubular members 20 are designated as 20a. At the ends of the parallel runs 20a, the longitudinal members 20 are bent inwardly and converge toward each other at their forward ends. The converging portion of the longitudinal members are designated by numeral 21. The longitudinal members 20 are secured in position, preferably by welding, to a pair of transverse connecting members 22 positioned substantially at right angles to the parallel runs 20a of the longitudinal members 20. Also secured to the transverse connecting members 22, and extending in parallel relation to the parallel runs 20a of the longitudinal members 20, and spaced symmetrically between the longitudinal members 20, is a tubular tongue 23 which extends further forward than do the forward ends 24 of the longitudinal members 20. The tubular sleeve 19 is positioned to receive telescopically therein the tubular tongue 23, as is shown in Figure 3.

The forwardly extending ends 24 of the longitudinal members 20 are secured, preferably by welding, to a longitudinal adjustment clamp 25 which is slidably positioned upon the tubular sleeve 19. Bolts 26 mounted on longitudinal adjustment clamp 25 provide means for loosening and tightening the clamp 25. Tubular tongue 23 and tubular sleeve 19 are so dimensioned that a slight constriction of tubular sleeve 19 results in the clamping of tongue 23 within sleeve 19.

Transverse connecting members 22 are shaped like channels as clearly shown in Figures 2 and 9. A pair of tubular cross members 27 are positioned adjacent each transverse connecting member 22 so that the tubular cross members 27 lie in the channel section of the channel 22. Each of the pair of cross members 27 extends beyond opposite ends of the transverse connecting member 22. Each tubular cross member 27 has one end portion 28 which is telescopically positioned in the channel of the connecting member 22. A plurality of transverse adjustment clamps 45, slidably positioned upon each transverse connecting member 22, are provided for clamping the telescopically positioned portion 28 of each cross member 27 against the transverse connecting member 22.

The other end portion 29 of the tubular cross member 27 is bent downwardly and serves as a supporting leg for the trailer 11. The bent section of cross member 27, between telescopically positioned end portion 28 and depending end portion 29, is reinforced by a plate 27a which is welded at the bent section to cross member 27. A pair of wheels 30 are provided for the trailer 11. The downwardly extending legs 29 are secured to wheel mounts 31 upon which wheels 30 are mounted.

The elements for securing and supporting the prow end of a boat, generally designated by the letter B, are shown in Figure 2. As shown therein a support 32 is secured, preferably by welding, to the vertical section 17 of tubular member 16. Mounted on support 32 is an upwardly extending pin 33. The prow of the boat B has mounted thereon a horizontal plate 34 having a hole 35 therethrough. Plate 34 is firmly secured to boat B by reinforcing, which is generally designated by the numeral 36. The hole 35 through plate 34 is dimensioned to receive upwardly extending pin 33 therethrough when the boat B is being carried by the trailer 11.

The elements for securing and supporting the stern end of the boat are clearly shown in Figures 4, 6 and 7. Mounted on the stern of the boat B, at a fixed distance apart, are a pair of male connectors 37. Each connector 37 consists of a plate 38 upon which is mounted a downwardly and outwardly extending finger 39. A plurality of bolts 40 secure the male connector 37 to the stern of the boat. The corresponding connecting member mounted on the trailer 11 is a female connector 41, which is secured to the downwardly extending end 42 of longitudinal members 20. Female connector 41 has a plate 43 having a slot 44 therethrough adapted to receive the downwardly and outwardly extending finger 39 of male connector 37. When the male and female connector are engaged, the plate portion 43 of female connector 41 lies flush with the plate portion 38 of male connector 37.

An extra safety device 52 for preventing the connectors from separating, comprising a cotter pin 53 set in the projecting member of the connection, is also shown. A similar extra safety device 52, shown in Figure 2, safely secures the prow of the boat to the trailer.

The transverse adjustment clamp 45, as shown in Figure 9, consists of a channel section 46 mounted adjacent the web of channel 22 and having therethrough a pair of holes 47 through which pass the legs 48 of a U-shaped member 49. The legs 48 are threaded at 50 to engage clamping nuts 51 which butt against the upper face of channel section 46. The U-shaped member 49 is so positioned that it bears against tubular cross member 28 to clamp member 28 against the web of channel 22 thus fixing cross member 27 in position.

In the initial adjustment of the trailer for use with a boat, the wheels 30 are spread apart to accommodate the width of the boat to be carried. This is accomplished by loosening the transverse adjustment clamps 45 and telescopically moving the cross members 27 outwardly with relation to the ends of transverse connecting members 22 until the correct width between the wheels 30 is reached. The clamps 45 are then tightened, fixing the wheels in the transverse position. Then, to adjust the length of the trailer, the longitudinal adjustment clamp 25 is loosened and the trailer is expanded lengthwise until it is long enough to receive the length of the boat to be carried. The prow of the boat is mounted on the upwardly extending pin 33 by hooking plate 34 over pin 33, and then the female and male connecting members at the stern of the boat are engaged. The clamp 25 is tightened and the boat B is then securely supported by trailer 11. After the initial adjustments are made for a particular size boat it is not necessary to make the adjustments each time the trailer is used, if the trailer is used to carry the same boat.

After the trailer is adjusted for a particular boat its use comprises wheeling the trailer to a position above the boat as it lies on the ground, then tilting the back end of the trailer downward and engaging the female and male connecting members, and then tilting the front end of the trailer downward until the pin 33 can be hooked into plate 34. The flexibility of the trailer permits mounting the boat on the trailer in this manner.

It will be noted that the female connectors 41 mounted on the downwardly extending portion 42 of longitudinal members 20 face toward the upwardly extending mounting pin 33. The plate portion 43 of female connector 41 bears against the plate portion 38 of male connector 37 and exerts a force in the forward direction, thus tending to push the boat forward. However, the upwardly extending pin 33, extending through hole 35 in the mounting plate 34 on the prow of the boat, engages plate 34 and prevents any such motion of the boat in the forward direction. Thus, in effect there is a three point clamping action provided by the two female connectors bearing against the male connectors and the upright extended pin 33 bearing against the mounting plate 34. This is very desirable in that it does not permit any motion of the boat relative to the trailer structure and eliminates the possibility of any inertia forces which may act upon the trailer due to any acceleration to which the trailer is subjected. In fact, the clamping action makes the trailer and boat act as a unit and all forces which would arise by reason of motion of the boat relative to the trailer are eliminated.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new and desire to secure by Letters Patent of the United States is:

1. A trailer for a boat, said trailer having a front end and a rear end and comprising a plurality of spaced longitudinal members, a longitudinal tongue, a plurality of transverse connecting members secured to said longitudinal members and said tongue, a tubular sleeve at the front end of said trailer positioned to receive telescopically therein said tongue, means mounted on said tubular sleeve for securing and supporting one end of the boat, the rear ends of said longitudinal members extending downwardly and having means thereon adapted to secure and support the other end of the boat, said latter means also bearing against the boat so as to clamp the boat between the latter means and the supporting means mounted on said tubular sleeve, a pair of cross members telescopically positioned with respect to each transverse connecting member, one cross member projecting from each end of said transverse connecting member, a downwardly extending supporting leg secured to the projecting end of each cross member, a pair of wheels, means for securing said supporting legs to said wheels, means for adjusting the distance between the support means for the boat adjacent the tubular sleeve and the support means for the boat at the rear ends of the longitudinal members, and means for adjusting the distance between the wheels.

2. A trailer for a boat, said trailer comprising a pair of spaced tubular members extending longitudinally in substantially parallel relation and then converging toward each other at one end, a tubular tongue extending in substantially parallel relation to the parallel runs of the longitudinal members and spaced symmetrically in relation thereto, a plurality of transverse connecting members positioned substantially at right angles to the parallel runs of the longitudinal members and the tongue and secured to said longitudinal members and said tongue, a tubular sleeve positioned to receive telescopically therein said tongue, a longitudinal adjustment clamp slidably positioned upon said tubular sleeve, said longitudinal adjustment clamp having secured thereto the converging ends of said longitudinal members, a pair of tubular cross members positioned adjacent each transverse connecting member, one end portion of each tubular cross member being telescopically positioned with respect to the adjacent connecting member, the other end portion of each tubular cross member being bent downwardly to serve as supporting legs for said trailer, a pair of wheels, means for securing said supporting legs to said wheels, a plurality of transverse adjustment clamps slidably positioned upon each transverse connecting member for clamping the tubular cross members against the transverse connecting members, supporting means mounted on said tubular sleeve for securing and supporting one end of the boat, the free ends of said longitudinal members being bent downwardly and having connecting means thereon adapted to secure and support the other end of the boat, and said latter connecting means also bearing against the boat so as to clamp the boat between the connecting means and the supporting means mounted on said tubular sleeve.

3. A trailer for a boat, said trailer comprising a pair of spaced tubular members extending longitudinally in substantially parallel relation and then converging toward each other at one end, a tubular tongue extending in substantially parallel relation to the parallel runs of the longitudinal members and spaced symmetrically in relation thereto, a plurality of transverse connecting members positioned substantially at right angles to the parallel runs of the longitudinal members and the tongue and secured to said longitudinal members and said tongue, a tubular sleeve positioned to receive telescopically therein said tongue, a longitudinal adjustment clamp slidably positioned upon said tubular sleeve, said longitudinal adjustment clamp having secured thereto the converging ends of said longitudinal members, a pair of tubular cross members positioned adjacent each transverse connecting member, one end portion of each tubular cross member being telescopically positioned with respect to the adjacent connecting member, the other end portion of each tubular cross member being bent downwardly to serve as supporting legs for said trailer, a pair of wheels, means for securing said supporting legs to said wheels, a plurality of transverse adjustment clamps slidably positioned upon each transverse connecting member for clamping the tubular cross members against the transverse connecting members, means mounted on said tubular sleeve for securing and supporting one end of the boat, and the free ends of said longitudinal members being bent downwardly and having means thereon adapted to secure and support the other end of the boat.

4. A trailer for a boat, said trailer comprising a pair of spaced tubular members extending longitudinally in substantially parallel relation and then converging toward each other at one end, a tubular tongue extending in substantially parallel relation to the parallel runs of the longitudinal members and spaced symmetrically in relation thereto, a plurality of transverse connecting members positioned substantially at right angles to the parallel runs of the longitudinal members and the tongue and secured to said longitudinal members and said tongue, a tubular sleeve positioned to receive telescopically therein said tongue, a longitudinal adjustment clamp slidably positioned upon said tubular sleeve, said longitudinal adjustment clamp having secured thereto the converging ends of said longitudinal members, a pair of cross members telescopically positioned with respect to each transverse connecting member, one cross member projecting from each end of said transverse connecting member, a downwardly extending supporting leg secured to the projecting end of each cross member, a pair of wheels, means for securing said supporting legs to said wheels, a plurality of transverse adjustment clamps slidably positioned upon each transverse connecting member for clamping the tubular cross members against the transverse connecting members, supporting means mounted on said tubular sleeve for securing and supporting one end of the boat, the free ends of said longitudinal members being bent downwardly and having connecting means thereon adapted to secure and support the other end of the boat, and said latter connecting means also bearing against the boat so as to clamp the boat between the latter means and the supporting means mounted on said tubular sleeve.

ALVIN D. COLE.
FRANK J. KOWALEWSKI.

REFERENCES CITED

The following references are of record in the file of this patent:

UNITED STATES PATENTS

| Number | Name | Date |
|---|---|---|
| Re. 22,914 | Ballinger | Sept. 16, 1947 |
| 1,709,925 | Van Duzer | Apr. 23, 1929 |
| 1,710,122 | Sorenson | Apr. 23, 1929 |